United States Patent
Mainwaring et al.

(10) Patent No.: US 7,434,475 B2
(45) Date of Patent: Oct. 14, 2008

(54) FABRICATED STRAIN SENSOR

(75) Inventors: David Mainwaring, Melbourne (AU); Pandiyan Murugaraj, Melbourne (AU)

(73) Assignee: Royal Melbourne Institute of Technology, Victoria (AU)

( * ) Notice: Subject to any disclaimer, the term of this patent is extended or adjusted under 35 U.S.C. 154(b) by 0 days.

(21) Appl. No.: 10/599,894

(22) PCT Filed: Apr. 12, 2005

(86) PCT No.: PCT/AU2005/000523

§ 371 (c)(1),
(2), (4) Date: Mar. 8, 2007

(87) PCT Pub. No.: WO2005/100939

PCT Pub. Date: Oct. 27, 2005

(65) Prior Publication Data

US 2007/0214895 A1    Sep. 20, 2007

(30) Foreign Application Priority Data

Apr. 13, 2004    (AU) .............................. 2004901907

(51) Int. Cl.
*B05D 5/12* (2006.01)
*G01B 7/16* (2006.01)
(52) U.S. Cl. .......................... 73/777; 427/527; 427/102
(58) Field of Classification Search ............. 73/777; 427/527, 102
See application file for complete search history.

(56) References Cited

U.S. PATENT DOCUMENTS

| | | | |
|---|---|---|---|
| 5,437,195 A | 8/1995 | Bureau et al. | |
| 5,817,944 A * | 10/1998 | Chung | 73/768 |
| 5,900,443 A * | 5/1999 | Stinnett et al. | 522/1 |
| 6,079,277 A * | 6/2000 | Chung | 73/774 |
| 6,276,214 B1 * | 8/2001 | Kimura et al. | 73/795 |

FOREIGN PATENT DOCUMENTS

| | | |
|---|---|---|
| JP | 61-121478 A | 6/1986 |
| JP | 04-086535 A | 3/1992 |
| JP | 08-236632 A | 9/1996 |

OTHER PUBLICATIONS

Terai et al. "Properties of carbon films produced from polyimide by high-energy ion irradiation" Nuclear Instruments and Methods in Physics Research B 166-167 (2000) 627-631. Accessed online Sep. 16, 2007.*
Fink et al. "Conductivity of Aged Non-Overlapping and Overlapping Tracks in Ion Irradiated Polyimide". Radiation Measurements, vol. 25, Issues 1-4, 1995, pp. 51-54.*
Svorcik et al. "Degradation of Polyimide by Implantation with Ar+ions". Journal of Applied Polymer Science, vol. 64, Issue 4, pp. 723-728, Published Online: Dec. 7, 1998.*
Lin et al. "Preparation and Properties of Conductive Polyimide Films". Journal of Polymer Research, Issue 9, pp. 189-194, 2002.*

* cited by examiner

*Primary Examiner*—Edward Lefkowitz
*Assistant Examiner*—Jonathan Dunlap
(74) *Attorney, Agent, or Firm*—Connolly Bove Lodge & Hutz LLP

(57) ABSTRACT

A method of forming a strain sensor from a polymeric film includes the steps of selectively irradiating a surface of the polymer with high energy radiation to change the composition of the polymer and increase the electrical conductivity in selected portions of the surface. The radiation can create carbonized particles or metallic particles within the polymer and the changes in interparticle gaps between conducting particles in the polymer will result in strain dependent electrical properties in the treated polymer.

8 Claims, 4 Drawing Sheets

FABRICATED STRAIN SENSOR

This application is the National Stage of International Application No. PCT/AU2005/000523 filed on Apr. 4, 2005; and this application claims priority of Application No. 2004901907 filed in Australia on Apr. 13, 2004 under 35 U.S.C. § 119; the entire contents of all are hereby incorporated by reference.

This invention relates to strain sensors particularly micro strain sensors that can be easily fabricated and used for continual monitoring of structures subject to strain.

BACKGROUND OF THE INVENTION

Polymeric strain gauges have been proposed.

WO 96 19758 discloses the preparation of pressure sensitive ink that can be used for the fabrication of pressure transducers such as strain gauges where the electrical resistance is indicative of the applied pressure. The ink has a composition of an elastic polymer and semiconductive nanoparticles uniformly dispersed in this polymer binder.

U.S. Pat. No. 55,817,944 discloses a strain sensor for a concrete structure containing conductive fibres.

U.S. Pat. No. 6,079,277 discloses a strain or stress sensor composed of a polymeric composite with a matrix of carbon filaments.

U.S. Pat. No. 6,276,214 discloses a strain sensor using a conductive particle—polymer complex. Carbon black is dispersed in an ethylene vinylacetate copolymer to produce a conductive polymeric matrix.

All these polymeric sensors are fabricated by preparing the conductive particles and then incorporating them in a polymer by solution or melt processing followed by film fabrication. This component is then pasted onto an insulating support and embedded onto the mechanical structure to be monitored. Electrical leads need to be connected to the sensor. Polymeric strain gauges relying on changes in resistance of a conducting film are usually unsatisfactory and do not have a long service life due to hysteresis. Generally metallic strain gauges are preferred.

WO 0223962 discloses a laser irradiation process for forming conducting patterns on an insulating substrate.

JP 2000216521 discloses patterning of circuits for printed circuit boards by laser irradiation.

U.S. Pat. No. 5,900,443 deals with near surface treatment process produced by irradiation with high-energy particle beams. The process is preferably implemented with pulsed ion beams. The process alters the chemical and mechanical properties of the polymer surface. The ion beam radiation can have various effects such as cross-linking, pyrolysing, etching or ablation of the polymer in the treated areas. However there is no mention of conductivity in the polymer. It is an object of this invention to develop a process with fewer fabrication steps to form easily mass produced strain sensors.

BRIEF DESCRIPTION OF THE INVENTION

To this end the present invention provides a method of forming a strain sensor from a polymeric film which includes the steps of selectively irradiating a surface of the polymer with high energy radiation to form conducting particles in the polymer to increase the electrical conductivity in selected portions of the surface.

This invention is partly predicated on the realization that the changes in the polymer, particularly the changes in inter-particle gaps between conducting particles in the polymer will result in strain dependent electrical properties in the treated polymer.

A suitable class of polymers is polyimide which is commonly used in micro electronics devices. When polyimide is subjected to high energy ions (such as $^{12}C$, $^{19}F$, $^{32}S$, $^{63}Cu$, Xe, He, N, Ne, Kr etc.) via irradiation of the required fluence (of the order $10^{14}$ to $10^{17}$ ions/cm$^2$), electrically conducting carbon particles are generated randomly in the polyimide matrix and thus a carbon-polyimide nanocomposite is formed instantly.

Three stages occur during this irradiation process:

In the first localized polymer degradation producing dangling bonds and free radicals;

In the second stage, gaseous products leaving the polymer with recombination of dangling bonds into some kind of disordered network of π-conjugated bonds and In the third stage, recrystallisation of the residual material in the irradiated region and the formation of metallic graphite clusters.

Such a composite is known to show enhanced electrical conductivity through variable range hopping/tunneling mechanisms. The electrical conductivity characteristics depends on the carbon particle density and inter-distance between the carbon particles which can be controlled by monitoring the irradiation parameters such as fluence, ion current and ion energy. The electrical conductivity of the composite structure can be controlled in a wide range between an insulating region and metallic region ($10^{-18}$ to $10^2$ S/cm)

These conducting carbon-polyimide composites are reported to have good stability and aging of these composites were not found to vary appreciably.

The electrical conductivity characteristics (temperature dependent/deformation dependent/voltage dependent etc.) of such a system depends on, the carbon particle size, concentration of carbon particles, and the inter-particle distances. In this invention deformation dependent changes in electrical properties of the carbon-polyimide nanocomposite film (which crucially depends on the changes in the inter-particle gaps occurring during deformation process) is exploited to achieve a strain sensor as an application of these films.

The concept of irradiation produced nanocomposite films for strain gauge devices provides a number of substantial product and fabrication process advantages:

1. Most importantly, the processing steps can be considerably reduced, no longer do nanoparticles have to be handled, stabilized, incorporated in polymer and dispersed in the thin films. Conducting particles are formed in-situ due to irradiation induced localized carbonization process. The particle size and its concentration can be controlled by monitoring the ion fluence and ion current.
2. A layer of defined thickness within a polymide film may be irradiated by controlling the radiation penetration depth leaving the remaining polyimide film unaffected with respect to its mechanical and electrical properties. This feature is not achievable by incorporating and mixing nanoparticles into the film material or precursors as traditionally carried out. Here is an advantage of having the conducting composite film and the insulating support in one and the same polyimide film
3. It is possible to form in-situ metal nanoparticles through metal compound and complex decomposition by irradiation, which through the selection of the irradiation parameters can occur without polymer decomposition and the formation of carbon nanoparticles. Mass transport mechanisms within the film can be employed to control diffusion and growth in particle size 4. It is possible to micro-pattern strain sensors directly within the irradiation process forming the carbon or metal nanoparticles. Thus nanocomposite film formation and micro-patterning may become a single step fabrication process, for example, masked or spatially directed irradiation.

DETAILED DESCRIPTION OF THE INVENTION

Figure 1:
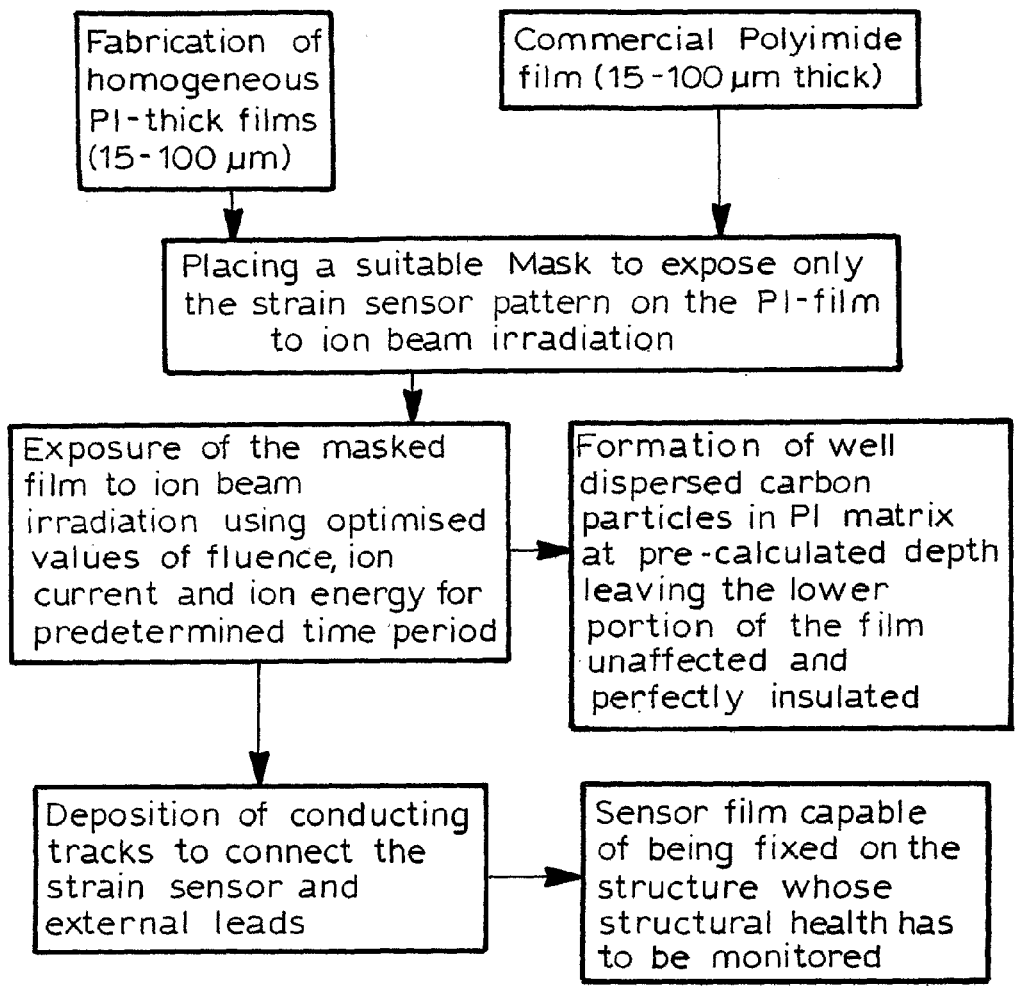
FIG. 1 illustrates the fabrication steps used in one embodiment of this invention.

Typical ion beam irradiation processes which may be used in this invention have been reported in the literature 1. Using ions of $^{12}$C, $^{19}$F, $^{32}$S, $^{63}$Cu etc. in the energy range of 30 to 60 MeV from a Van de Graaff Tandem Accelerator polyimide films were irradiated. Beam currents were limited 30 nA for S and Cu ions and 100 nA for C and F ions. Thin 7.5 and 12.5 μm polyimide films were used such that the ions were transmitted through the sample. The ions loose their energy to the polyimide matrix by electronic slowing down process along the trajectory. The conductivities achieved were up to $10^2$ S/cm. (Salvetat et al., Phys. Rev. B 55 (1997) 6238).

2. The ions of Xe, He, N, Ne, Kr are used in the energy range 100 to 700 keV and fluence in the range $10^{16}$ to $10^{17}$. The conductivity achieved is 0.0005 to 360 S/cm (Davenas et al, UMR, CNRS (NIMB 32 (1988) 136) Other ions used by earlier authors are ionized B, Ne etc.

Also suitable for this invention are processes where an alternative irradiation source is used—UV (275-380 nm KrF laser)

The intensity used is in the range 10-1000 kW/cm$^2$ and conductivity achieved is as high as 25 S/cm. Results from three research groups are:

1. Feurer et al. (Applied Physics A: Solids and Surfaces, vol 56 (1993) 275) also reports on KrF laser induced conductivity. In their experiments, the typical laser parameters that the authors used were fluence of 40-80 mJ/cm$^{-2}$ at repetition rate of 5 Hz. The critical number of shots, $N_c$ as well as the order of magnitude of conductivity, reached after approximately after 1000 shots, both depend on the fluence. For a fluence of about 40 mJ/cm$^2$, $N_c$ is 270; the saturation conductivity reaches above 1000 shots to about 0.1 S/cm and 10 S/cm for 80 mJ/cm$^2$ fluence. Excimer laser is capable of permanently changing the resistivity of the polyimide by 16 orders of magnitude.

2. Continuous UV (275-363 nm) focused on the spot such that its intensity 10-100 kW/cm$^2$ can write conducting pattern at speeds up to 90 cm/s on the surface of a film of polyimide and a conductivity of 20-25 S/cm is reached (lines as narrow as 15 microns or as uniform areas of upto 2 cm$^2$ can be produced. Conductivities did not degrade for months (Synthetic Metals 66 (1994) 301, Chem. Mater. 6 (1994) 888 UV tech Associates in New York, Srinivasan et al)

3. 1993 paper by Phillips et al. (App. Phys. Lett. 62 (1993) 2572) claims to be the first paper to make permenant electrically conducting periodic structures with sub micron spatial resolution. KrF laser (248 nm) is used in this work. (Laser irradiation of polyimide above a certain threshold fluence (~20 mJ/cm2) produces localized clusters of carbon rich material with average diameters around 10 nm. After a number of shots, these clusters become interconnected, and the conductivity undergoes metal insulator percolative phase transition. Bulk sample was irradiated with a uniform fluence of 40 mJ/cm2 and 2100 laser shots. The resistance measured was 310 kiloOhms corresponding to 15 ohm cm micrometer)

Other types of irradiation sources which may be used are:

Gamma rays $10^7$ to $10^9$.

Protons 7.7 MeV at $1 \cdot 10^4$ Gy/s

Electron beam 900 keV

The process steps required for the fabrication of strain sensor through the currently proposed process are illustrated in FIG. 1:

1. Fabrication of highly homogeneous thick polyimide films (15-50 microns)/or procurement of commercially available prefabricated films.

2. Design of suitable mask to selectively irradiate the polyimide

3. Irradiate the film with predetermined fluence and ion current values so that carbonization occurs only on the unmasked area and to the depth determined by the fluence, energy and ion current.

4. The conducting tracks for electrode formation also can be achieved through the same irradiation process with different set of fluence and ion current values.

5. This can be directly laid on to the mechanical structure under investigation.

Hence to fabricate a strain sensor on a polyimide film, the top surface of the film should be subjected to irradiation process through suitable mask for the formation of the conducting strain sensor pattern. Control of the irradiation parameters will allow the bottom portion of the polyimide film unaffected by the radiation. This portion of the film would act as a supporting base. This enables direct embedding of the strain sensor on to the mechanical structure that has to be studied.

The following are examples of specific irradiation parameters that produce specific values of conductivity.

1. Terai and Kobayashi (NIMB 166-167 (2000) 627)

PI film used: 14 μm thick cut into 2×2 cm squares and only 1 cm by 1 cm area was irradiated using an aluminium mask Irradiation Parameters: Ni$^{3+}$ accelerated to 4 MeV and the beam was scanned so that the fluence was same for all the irradiated area; Irradiation fluence was from 3.5 $10^{12}$ to $1.0 \times 10^{16}$ cm$^{-2}$ and the current density 100 μA cm$^{-2}$ under $10^{-5}$ Pa. The temperature of the rear side of the specimen was less than 50° C.

Electrical Conductivity: Their data shows that at a typical fluence of $10^{15}$ cm$^{-2}$, a sheet resistance of 100-1000 ohms is achieved.

Depth profile of Ni atoms: The mean ion range in the polyimide specimen was 3 μm 2. Davenas, Boiteux and Xu, NIMB 32 (1988) 136
   PI-Films Used: No details
   Irradiation Parameters: Xe$^+$ beam of current density 0.5 µA/cm$^2$ at different energies between 1.5 MeV and 500 keV and fluence used in the order or $10^{15}$ to $10^{17}$ Xe$^+$/cm$^2$
   Electrical Conductivity: The sheet resistance obtained was between 50 and 10000 ohms. for 0.5 MeV, 10000 ohms is obtained ($10^{17}$ Xe$^+$/cm$^2$); for 0.7 MeV, 100 ohms is obtained ($10^{17}$ Xe$^+$/cm$^2$)
3. De Bonis, Bearzotti and Marietta NIMB 151 (1999) 101
   PI films used: 1.3 micron films were spin coated on 5 inch wafer
   Irradiation Parameters: Irradiated with 600 keV Ar$^+$ ions from $10^{14}$ to $10^{15}$ in a high voltage ion implanter. The ion current was below 100 nA Projected range of ion was 0.7 µm.
   Electrical Conductivity: Current voltage measurements were performed 380 ohm were obtained for sample when irradiated with $10^{15}$ ions per cm$^{-2}$
4. Feurer, Sauerbrey, Smayling, and Story, App. Phys. A 56 (1993) 275
   PI Films: Kapton foils of 50 microns thick were used
   Irradiation Parameters: KrF laser is used for irradiation process. Irradiated with an injection controlled KrF which emitted 30 ns (FWHM) pulses with a repetition rate between 0.5 and 8 Hz, in both directions. The sample was also rotated at a speed of 10 revolutions per minute.
   Depth of Conducting Layer: 50 nm thick conducting layer was formed
   Electrical conductivity: Above a fluence threshold of 20 mJcm$^{-2}$, the electrical conductivity exhibits insulator-conductor transition after a critical number of shots. With 40 mJ cm$^{-2}$ at a laser repetition rate of 5 Hz, a conductivity value of $10^{-4}$ S/cm (resistivity of the order 10000 ohm-cm) is reached after 1000 shots.

FABRICATION EXAMPLE

Fabrication of polyimide thin films of uniform thickness:
Polyamic acid of benzophenone tetracarboxylic dianhydride and 4,4'-oxybisbenzenamine (BPDA-ODA) in n-methyl 2-pyrollidone (NMP) solvent was used for film fabrication. Thin films of polyamic acid in NMP solvent were slip cast on to a flat substrate such as quartz, glass or silicon wafers. The films were then dried at 100° C. and cured in the temperature range 180-300° C. in an inert atmosphere to obtain a robust and stress-free polyimide thin film. The resulting films possessed a smooth surface and uniform thickness. The thicknesses of these films were tuned in the range 50-100 µm by controlling the viscosity of the polyamic acid solution used.
Irradiation of the polyimide film:
The films were then placed on a sample holder and positioned across the high energy ion beam in the Van De Graff Tandem Accelerator. The sample holder was made of metal to enable the heat generated during the irradiation process to be dissipated evenly thus minimizing localized heat induced damage. A parallel beam of high-energy ions was allowed to impinge on the surface of the polyimide film within the predetermined area by suitably manipulating the slit width. In the example described below the area of exposure was a 8 mm by 8 mm square.

Figure 2:
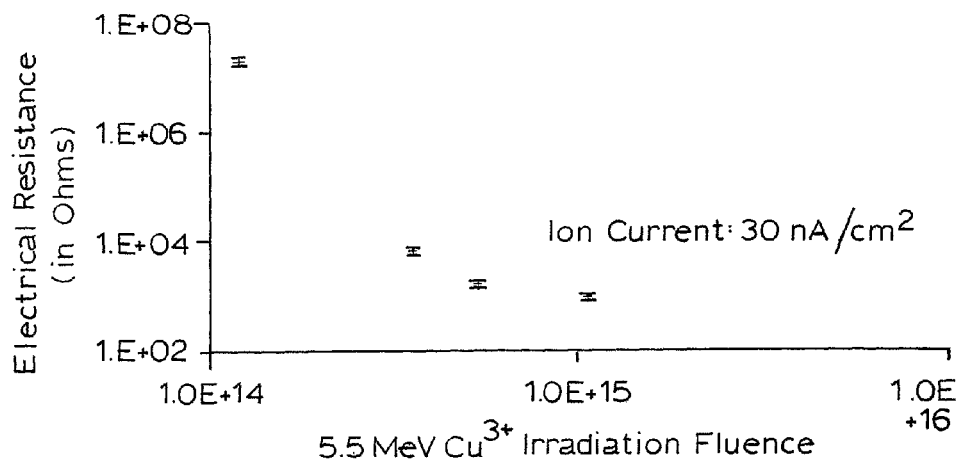
FIG. 2 illustrates the variation of electrical resistance at 25° C. of the irradiated polyimide thin films with increasing fluence values.
Figure 3:
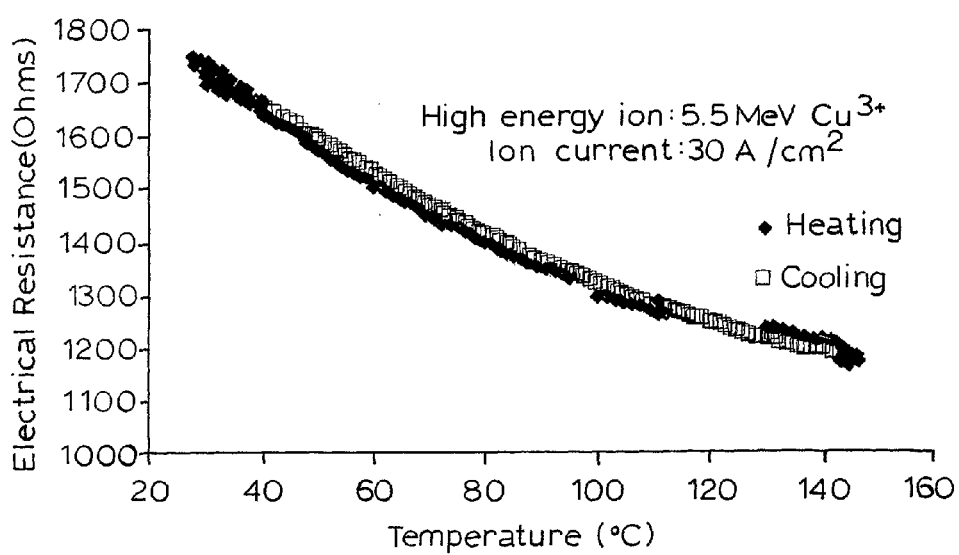
FIG. 3 illustrates Temperature Dependent electrical resistance variation in polyimide thin film irradiated with a fluence of $5.38 \times 10^{14}$ ions/cm$^2$ of 5.5 MeV CU$^{3+}$ ions.
Figure 4:
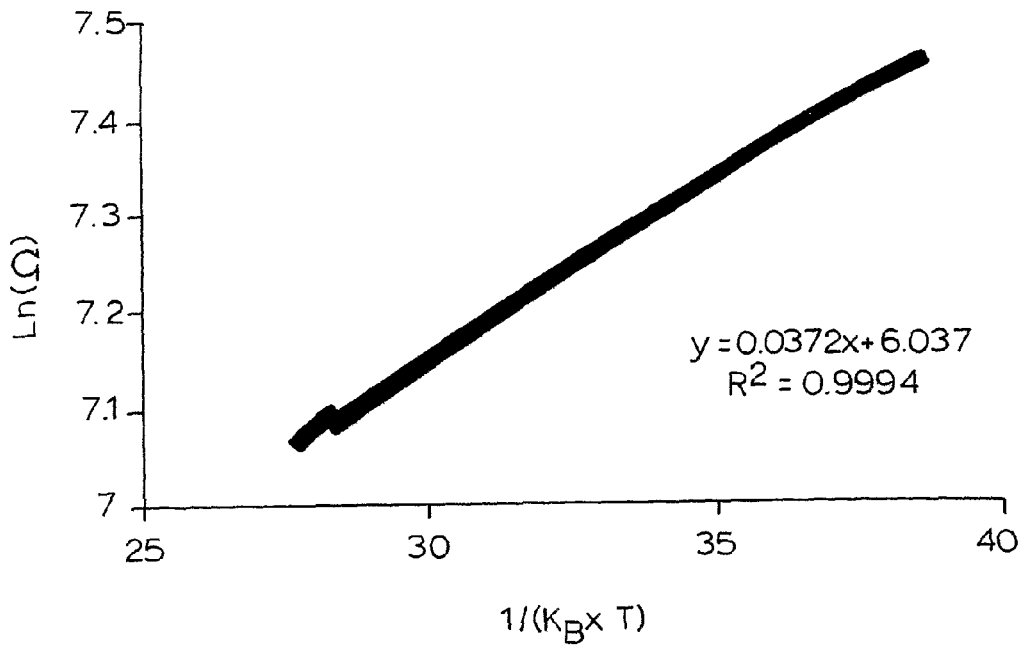
FIG. 4 illustrates the activation energy plot for the sample irradiated with $5.38 \times 10^{14}$ ions/cm$^2$ of 5.5 MeV Cu$^{3+}$.
Figure 5:
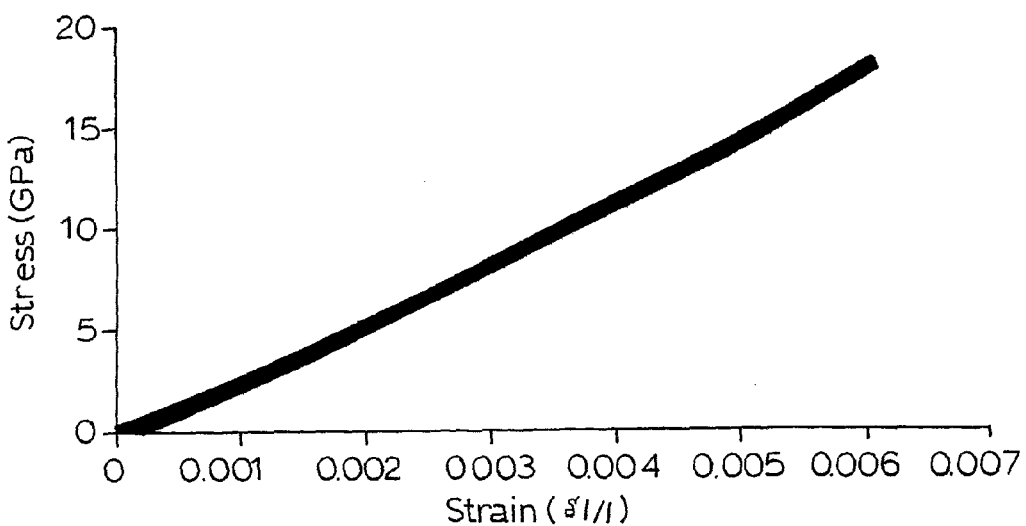
FIG. 5 illustrates a typical static stress-strain plot obtained on a sample irradiated 5.5 MeV Cu$^{3+}$ ions.
Figure 6:
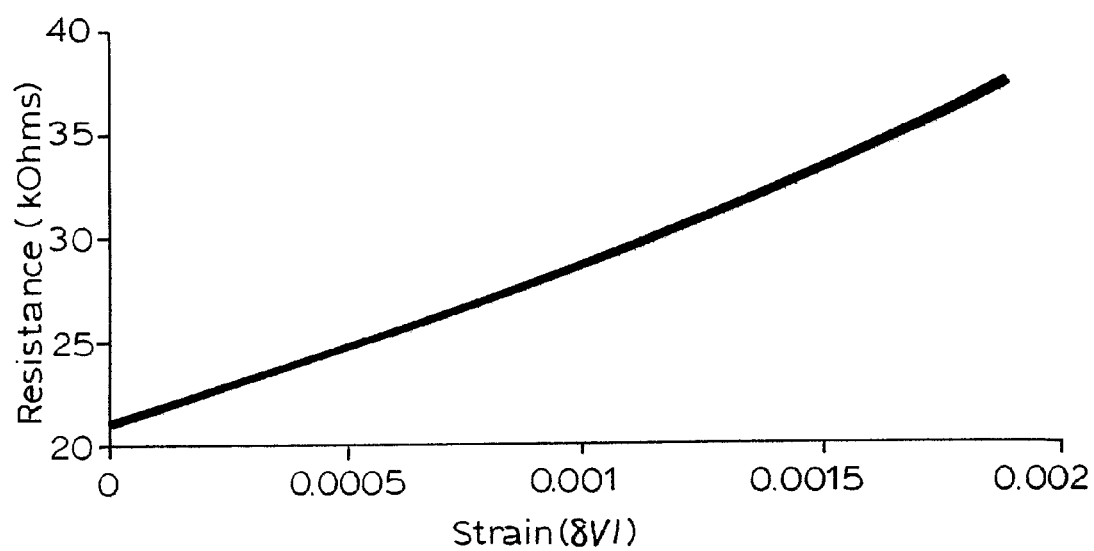
FIG. 6 illustrates typical electromechanical behaviour of the sample irradiated with $5.38 \times 10^{14}$ ions/cm$^2$ of 5.5 MeV CU$^{3+}$.

Irradiation parameters employed:
These films were subjected to irradiation using ions of lighter elements such as $^{19}$F and heavy ions such as $^{63}$Cu. The energy of these ions used for irradiating the polyimide films lay between 5 and 60 MeV. Accordingly, the penetration depth of the ions varied from 5 microns for low energy ions to 20 microns for high-energy ions. The beam currents used were in the range 10 to 100 nA for ions of light elements such as $^{19}$F and 5 to 50 nA for ions of heavy elements such as $^{63}$Cu.
Electrical characteristics of irradiated polyimide thin films:
Electrical measurements were performed on polyimide film strips containing irradiated portions of 1.0 mm wide and 5 mm long. Ohmic contacts for these filmstrips were provided with sputtered gold patches.
When $^{63}$Cu ions with 5.5 MeV were employed, the electrical resistance values at room temperature (25° C.) varied from $2\times10^7$ ohms for the $1.2\times10^{14}$ ions/cm$^2$ fluence to $1\times10^3$ ohms for the $1\times10^{15}$ ions/cm$^2$ fluence. FIG. 1 shows the fluence dependent electrical resistance values measured at 25° C. on the irradiated polyimide thin film strips. The temperature dependent electrical resistance measurements show that the irradiated polyimide thin films possessed semiconducting behaviour when the fluence was restricted to less than $1\times10^{15}$ ions/cm$^2$. FIG. 2 shows the temperature dependent electrical resistance variation for the polyimide thin film sample irradiated with a fluence of $5.38\times10^{14}$ ions/cm$^2$. The activation energy for charge transport was calculated for this film to be 37.2 meV (FIG. 3).
Micromechanical and electromechanical characteristics of irradiated polyimide thin films:
Irradiated polyimide films showed excellent reproducible micromechanical properties up to 7000 microstrain values. FIG. 4 shows the static stress-strain plot obtained for an irradiated polyimide thin film. The micromechanical measurements showed that the Young's modulus values increased to 3.1 GPa for these irradiated polyimide thin film samples compared to 2.4 to 2.5 GPa obtained for the unirradiated films.
Electromechanical measurements were performed on a thin strip sample of irradiated polyimide of dimensions 3 mm by length and 1 mm by width. The thickness of the film was measured to be 100 microns. The typical gauge factors obtained for these films rise progressively with applied stain, for example the gauge factor was 200 for a value of 500 microstrains and rose progressively to 400 for values of 2000 microstrains. FIG. 5 shows a typical electromechanical response for the polyimide film strip irradiated with a fluence of $4.0\times10^{14}$ ions/cm$^2$. Gauge factor obtained for this strain sensor element is about 400. The electrical resistance of the strip increased from 21 kOhms (for the unstrained condition) to 38 kOhms when 2000 microstrains was applied.
Electron Microscopic investigations on the irradiated polyimide thin films:
When $^{63}$Cu ions with energy 5.5 MeV was employed, the irradiation induced effects was seen up to a depth of 10 microns as confirmed from the scanning electron microscopic investigations. This value of 10 microns is close to calculated penetration depth of the 5.5 MeV $^{63}$Cu ion in polyimide films which is 7-8 microns.
This newly proposed method simplifies the strain sensor fabrication process since in the currently known fabrication processes, the conducting composite strain sensor has to be rested on an insulating support before it can be imbedded onto the structure whose deformation characteristic is to be investigated.

The invention claimed is:

1. A strain sensor which consists of a polymer that has been irradiated with less than $1\times10^{15}$ ions /cm$^2$ in a portion of its surface to exhibit strain dependent electrical properties for producing a measurable electrical signal that is linear with increasing strain, conducting tracks being deposited onto the treated portion to enable the sensor to be connected to an external electric circuit.

2. A strain sensor as claimed in claim 1 in which the polymer is a polyimide film.

3. A method of forming a strain sensor from a polymeric film which includes the steps of selectively irradiating a surface of the polymer with high energy radiation at an intensity less than $1\times10^{15}$ ions /cm$^2$ to exhibit strain dependent electrical properties in selected portions of the surface for producing a measurable electrical signal that is linear with increasing strain.

4. A method as claimed in claim 3 in which the high energy radiation carbonizes the polymer to form conductive particles in the polymer.

5. A method as claimed in claim 3 in which high energy ions impinge on a polymer film containing precursor metal compounds, such that decomposition of the precursor leads to nucleation of conducting metal particles.

6. A method as claimed in claim 3 in which the polymer is a polyimide.

7. A method as claimed in claim 3 in which conducting tracks are deposited onto the treated polymer to enable the device to be connected to an external electric circuit.

8. A strain sensor made by the method of claim 3 wherein, the strain sensor consists of a polymer that has been irradiated with less than $1\times10^{15}$ ions/cm$^2$ in a portion of its surface to exhibit strain dependent electrical properties for producing a measurable electrical signal that is linear with increasing strain and conducting tracks being deposited onto the treated portion to enable the sensor to be connected to an external electric circuit.

* * * * *